United States Patent [19]
Hirsch

[11] 4,400,068
[45] Aug. 23, 1983

[54] MICROFICHE READER CARRIER ASSEMBLY

[75] Inventor: Stephen P. Hirsch, North Prairie, Wis.

[73] Assignee: Realist, Inc., Menomonee Falls, Wis.

[21] Appl. No.: 369,830

[22] Filed: Apr. 19, 1982

[51] Int. Cl.³ .......................................... G03B 23/08
[52] U.S. Cl. .................................. 353/27 R; 353/23; 33/1 M; 355/54
[58] Field of Search .................. 353/27 A, 27 R, 23, 353/95; 33/1 M; 308/3 A, 6 R, 3.8; 355/53, 54

[56] References Cited

U.S. PATENT DOCUMENTS

| | | | |
|---|---|---|---|
| 2,299,677 | 10/1942 | Bickel | 308/3 A |
| 2,564,658 | 8/1951 | Jakeway | 308/3.8 |
| 3,186,772 | 6/1965 | Cohn | 308/3.8 |
| 3,790,266 | 2/1974 | Ueda et al. | 353/27 R |
| 4,245,898 | 1/1981 | Hall | 353/27 R |
| 4,262,974 | 4/1981 | Tojo et al. | 308/3 A X |

FOREIGN PATENT DOCUMENTS

| | | | |
|---|---|---|---|
| 2472204 | 6/1981 | France. | |
| 701924 | 1/1954 | United Kingdom | 308/6 R |
| 2069171 | 8/1981 | United Kingdom | 353/27 R |

Primary Examiner—Stephen Marcus
Assistant Examiner—William R. Sharp
Attorney, Agent, or Firm—Bayard H. Michael

[57] ABSTRACT

The microfiche carrier slides laterally on front and rear ball bearings between the carrier and subcarrier. The front bearing permits vertical separation of the carrier from the subcarrier and the rear ball bearing then permits the race member carried by the carrier to be withdrawn from between the upper and lower sets of ball bearings. In use the carrier is latched to the subcarrier by a latch carried by the transparent index pressure plate. The subcarrier is mounted on the base by ball bearings. The base contains the electrical components and the light source and condenser lens. The base can be withdrawn from the housing as a unit with the carrier attached.

9 Claims, 7 Drawing Figures

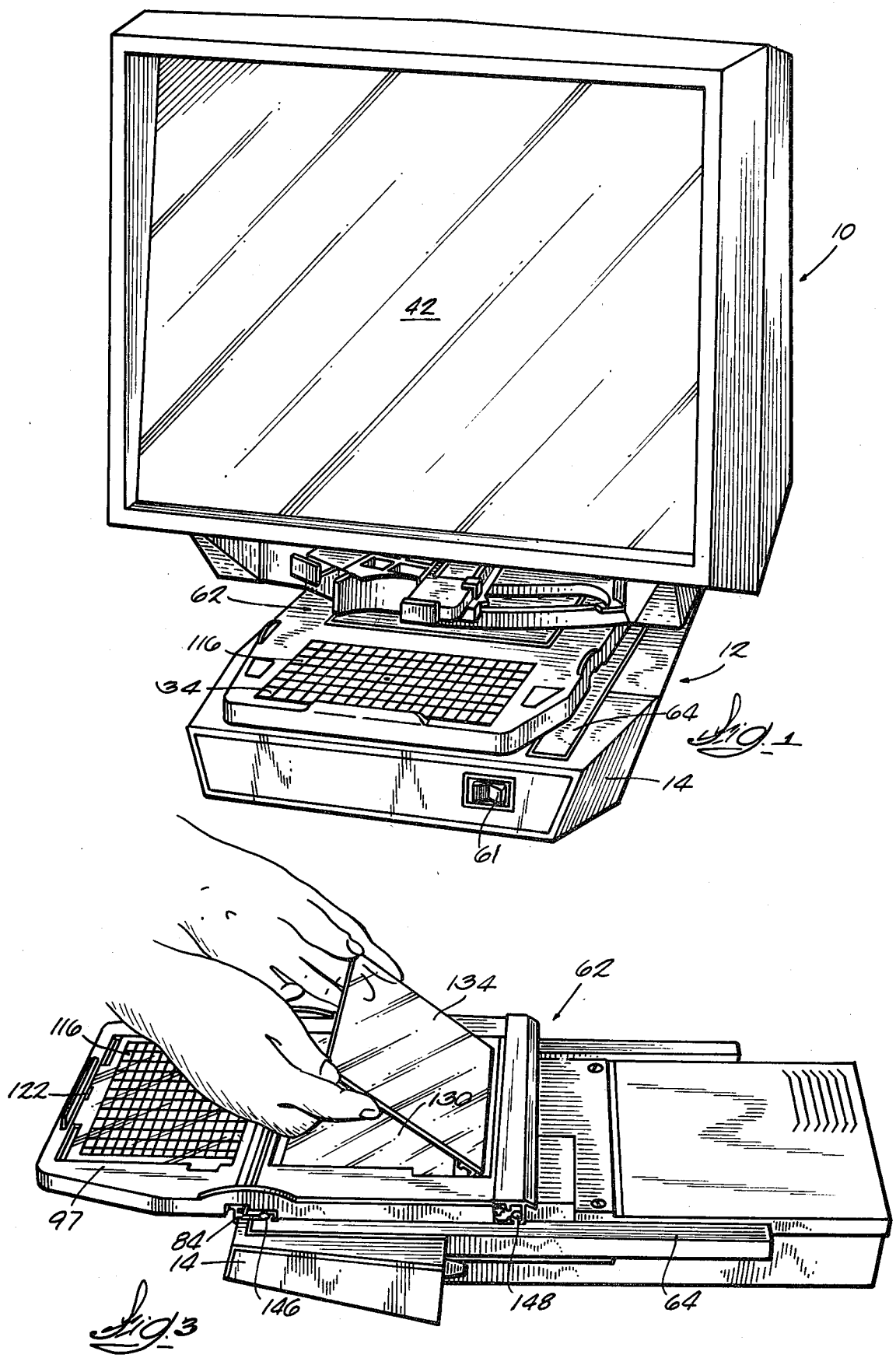

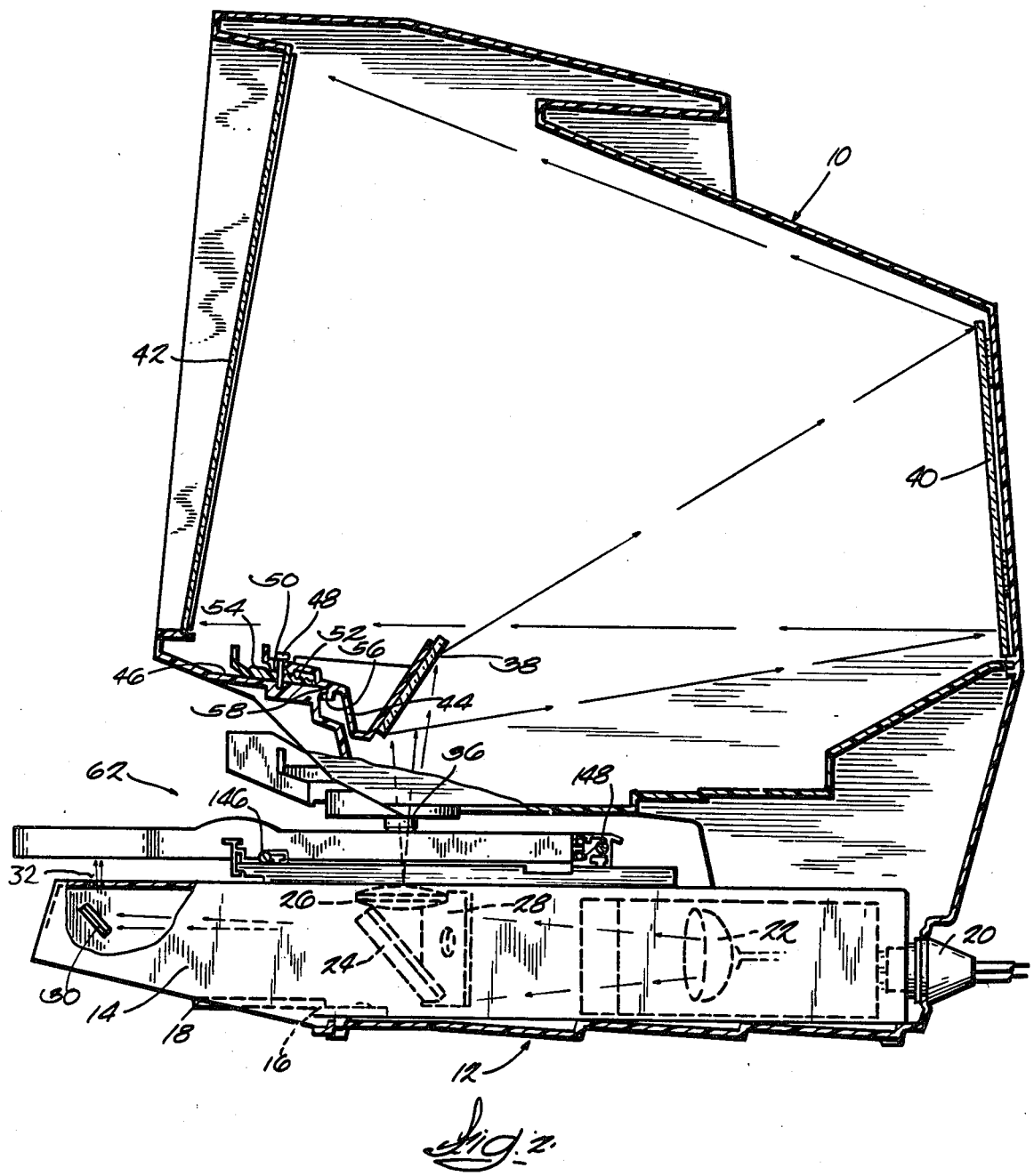

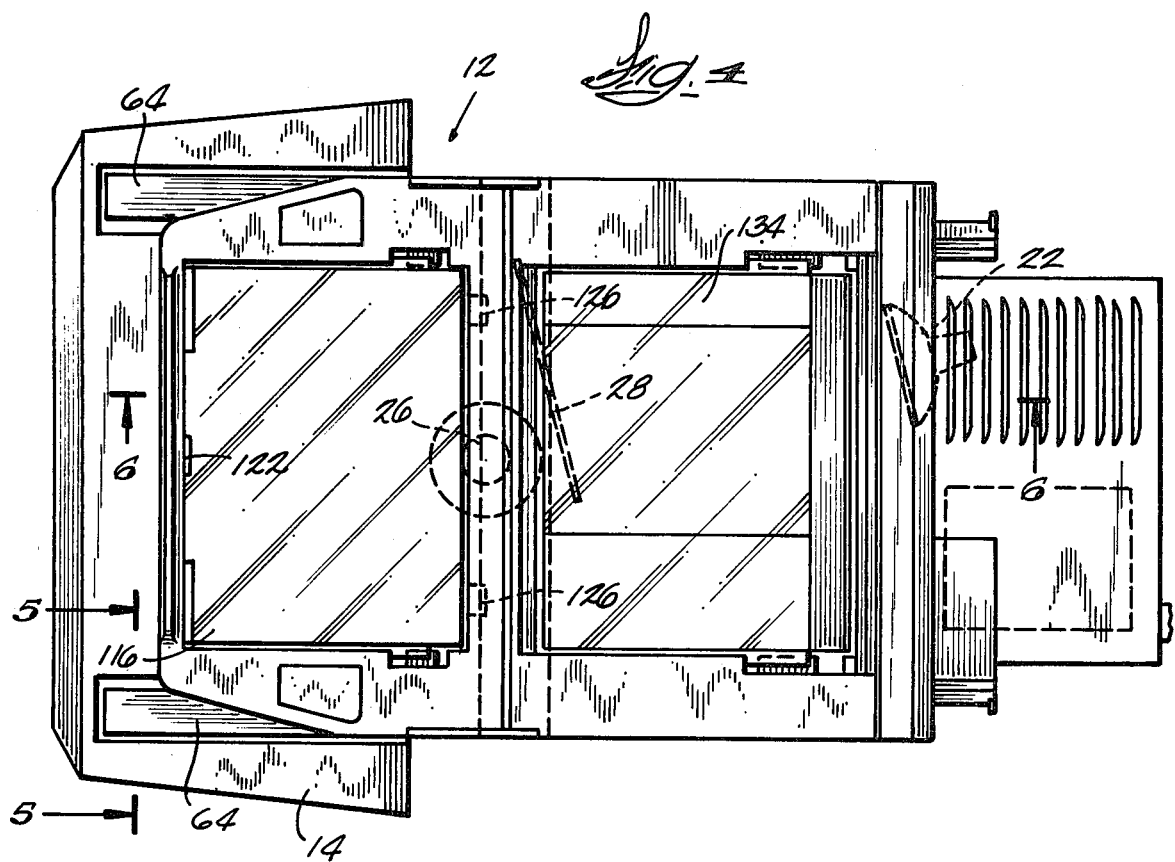
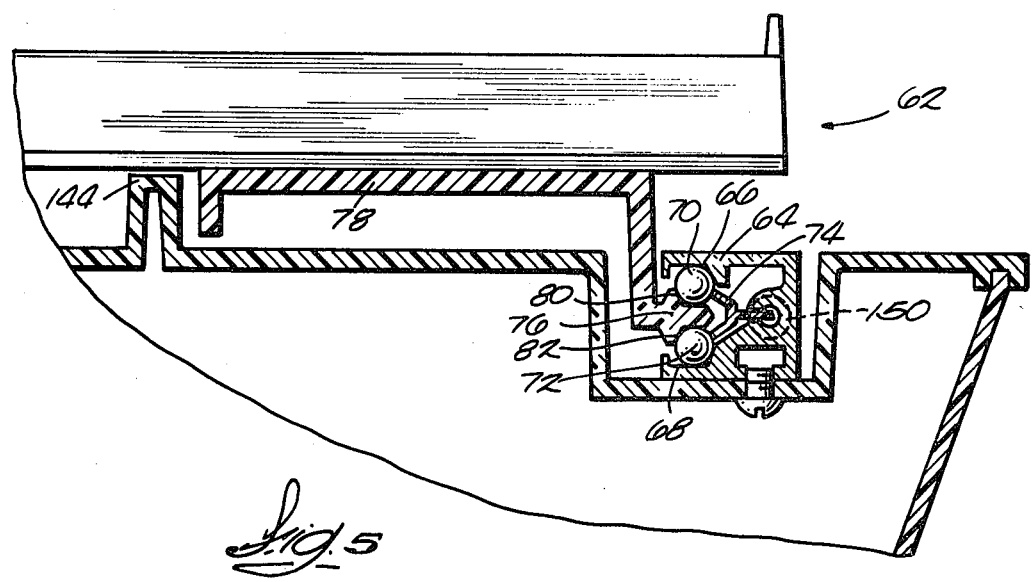

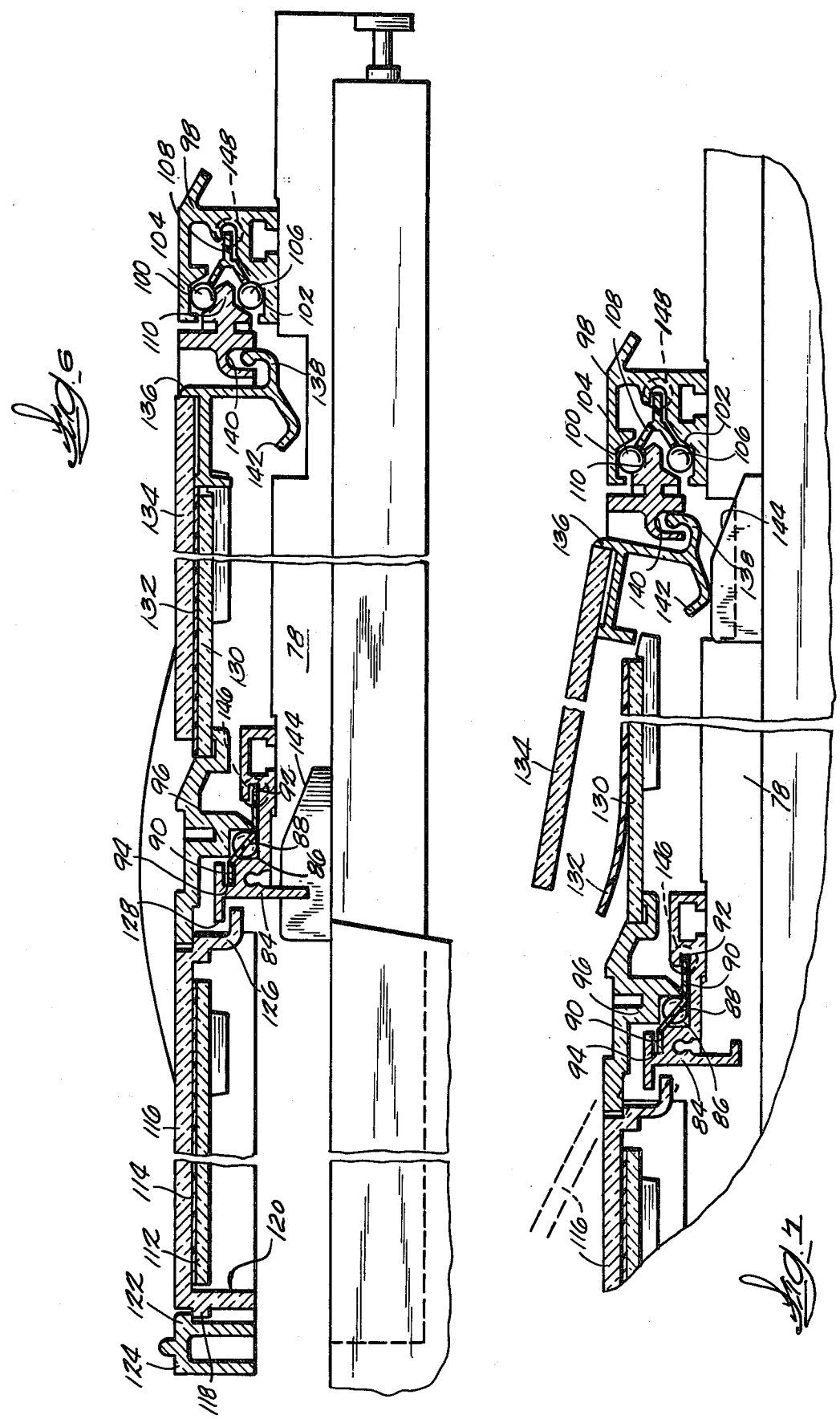

MICROFICHE READER CARRIER ASSEMBLY

BACKGROUND OF THE INVENTION

Microfiche Readers are provided with a fiche carrier which is moveable in a horizontal plane to position the desired image in the projection stage. The image is located by reference to an index grid, the usual arrangement being to provide a fixed grid and a pointer connected to the carrier so when the pointer is moved to the correct index mark the fiche is correctly positioned. A more satisfactory method is shown in Hall U.S. Pat. No. 4,245,898. In that patent, the carrier supports a translucent index and the index is manipulated until the correct coordinates are shown by a spot of light projecting up from the base. In manipulating the carrier, the user tends to bear down on the front portion of the carrier which inherently is cantilevered in front of the bearing support. This imparts a tilting movement to the carrier. Hall does not provide any method for preventing the tilting since his bearing arrangement comprises V-shaped rollers running on rails on the subcarrier. Bearings of this type leave room for improvement by way of resisting tilting and reducing friction. Hall provides a removeable drawer for gaining access to the projection bulb but the other electrical components are mounted in the main base of the reader. This requires use of flame retardent plastic to meet Underwriters Laboratories standards.

CROSS REFERENCE TO RELATED APPLICATION

The following disclosure describes bearings which have great utility in conjunction with this carrier, but these bearings and the bearing retainer are thought to be novel per se. Accordingly, the bearing and bearing retainer are separately claimed in co-pending application Ser. No. 369,581, filed Apr. 19, 1982.

SUMMARY OF THE INVENTION

The object of this invention is to provide a fiche and index carrier which has exceptionally smooth motion and is mounted on bearings which prevent tilting the carrier in use. The carrier is, in effect, latched down on the subcarrier during normal use but can be released to permit removal of the carrier for cleaning the glass plates, etc. The bearings provided will take both upward and downward pressure and yet will permit easy removal of the carrier. The forward bearing for the carrier takes downward pressure only, but that is the only pressure to which they are normally subjected.

Another object is to fix the index grid in place so as to insure more accurate location in use. The cover which holds the index in place also functions as the latch for retaining the carrier on the subcarrier. Another object of this invention is to support the subcarrier on a base which is part of a drawer which can be removed for access to all the electrical components for the reader, the components being mounted in the drawer in a metal enclosure which obviates the need for use of flame retardent plastics in the remainder of the reader. This leads to substantial cost savings.

BRIEF DESCRIPTION OF THE DRAWINGS

FIG. 1 is a perspective view of a microfiche reader according to the present invention.

FIG. 2 is a vertical section through the reader with parts broken away and some parts shown in dotted lines to orient the system.

FIG. 3 is a perspective view of the drawer or base removed from the reader.

FIG. 4 is a plan view of the base with certain parts shown in dotted lines to orient the system.

FIG. 5 is an enlarged sectional view taken on Line 5—5 in FIG. 4.

FIG. 6 is a vertical section taken on Line 6—6 in FIG. 4.

FIG. 7 is an enlarged section of a portion of FIG. 6.

DETAILED DESCRIPTION OF THE DRAWINGS

The reader has a housing 10 which includes a lower portion 12 in which a drawer or base 14 is mounted for easy removal by pulling the drawer forwardly after first releasing latch 16 by pressing the exposed end 18 upwardly to lift the latch out of the cooperating aperture in the lower portion of the housing. The rear of the drawer is provided with an electrical connection which automatically disconnects the drawer from the power supply 20 as the drawer is removed. The power supply feeds a transformer which steps down the voltage supply for bulb 22 which projects light forwardly to mirror 24 which reflects the light upwardly through condenser lens 26. All portions of the drawer exposed to heat are made of metal. The metal structure includes baffle 28 which is apertured to let light pass to mirror 24, and a certain amount of light will spill on to the small mirror 30 positioned at the front of the base to reflect light up through the aperture 32 in the upper surface of the base to give a small spot of light which serves as the index illuminating the proper coordinates on the index grid 34 to enable rapid location of the desired image on the microfiche. Light passing through the microfiche image passes through lens 36 and strikes the front surface mirror 38 which reflects the image to the mirror 40 at the back of the housing 10 and the image then is reflected forwardly to the rear projection screen 42.

The first mirror 38 is supported on a plastic support bracket 44 which is fixed to the divider panel 46 by means of screw 48. The underside of the bracket 44 is provided with a tooth 50 which engages serrations 52 on the upper surface of the adjusting wedge 54 while the hook 56 depending from the bracket engages lip 58 to serve as a pivot point. This enables the angle of the mirror to be precisely adjusted before screw 48 is tightened to precisely locate the image on the screen. Once adjusted at the factory this should require no further attention.

The front of the drawer is provided with the power switch 61 to operate the light at high, low or off. The drawer contains all the electrical and lower optical system. The microfiche and index carrier 62 is carried on the base for free movement from front to back and side to side to enable the desired fiche image to be located. The carrier is removed with the drawer so servicing of either is simple. The reader is provided with means for rapidly selecting either of two lenses for different magnification and means are provided for focusing the lens in use independent of the other.

The base or drawer 14 has a rail 64 at each side extending front to rear. Each rail is an extruded part providing upper and lower races 66, 68 for ball bearings 70, 72 carried by plastic retainer 74 which serves to retain the balls and to bias the balls against the races with sufficient space therebetween to receive race member 76 between the balls. Race member 76 depends from subcarrier 78 and has upper and lower races 80, 82 cooperating with the balls 70, 72. This bearing arrangement will take either downward or upward vertical loading and insures a smooth running subcarrier 78.

As noted above, the bearing construction and the retainer is the subject matter of a separate patent application.

Subcarrier 78 supports two parallel, laterally extending rails. The front rail 84 has a race 86 for balls 88 retained in the race by plastic retainer 90. The edges of the retainer 90 are captured in cavities 92, 94 so the retainer is retained in the rail and the balls are retained on the race. The balls support the downwardly and forwardly facing race 94 on the underside of the central cross member of the carrier 62. This bearing arrangement will take a downward load only and the carrier could be moved upwardly relative to the rail 84 but is normally latched to the rail. The subcarrier is also provided with an extruded rear rail 98 quite similar to the side rails on the base in that it provides races 100, 102 for the upper and lower balls 104, 106 which are retained by retainer 108 which spaces the balls to receive the intermediate race member 110 formed on the rear of the carrier 62. This intermediate race 110 permits the back bearing assembly to take upward and downward loading while being fully supported by ball bearings in either mode thus assuring a smooth running carrier.

The carrier 62 has two rectangular apertures. The forward aperture receives a transparent plate 112 which remains in position unless removed for cleaning. An index transparency 114 is positioned between plate 112 and the overlying transparent plate 116 which is latched down by forcing the projection 118 on the depending leg 120 past the lip 122 projecting rearwardly from the front cross rail 124 of the carrier. When the plate 116 is latched down the depending latch 126 on the rear edge of upper plate 116 passes under the lip 128 projecting forwardly from the subcarrier cross rail 84. Thus, when plate 116 is latched down, it in turn latches the carrier to the subcarrier. If the front edge of plate 116 is released, however, the plate 116 can be raised to permit changing the index 114 or to move the latch hook 126 from the solid line position shown in FIG. 7 to the dotted line position shown in FIG. 7 at which time the carrier is no longer latched to the subcarrier. At this point the entire carrier can be pivoted (or raised) about the rear bearing assembly and moved forwardly to draw the intermediate bearing 110 from between the rear ball bearings 102, 104 thus releasing the entire carrier from the subcarrier. Assembly is a simple reversal of the process.

The carrier also includes a rearwardly disposed aperture in which glass plate 130 is fixed with microfiche 132 supported by the glass and held to the glass by an upper glass plate 134. The upper plate has an extruded part 136 bonded to this rear edge. This part is a depending hook portion 138 which hooks (in FIG. 6) upwardly into the downwardly opening cavity 140 in the rear cross member of the carrier. The member 136 also includes a cam follower 142 which in FIG. 6 merely projects downwardly without contacting anything. But when the carrier is pulled forwardly the follower 142 rides up on cam 144 projecting upwardly from the base or drawer. This forces the upper glass plate 134 to pivot around the end of the hook 138 in cavity 140 to swing the glass to an open position as illustrated in FIG. 7. When the carrier is in the forward position to change the fiche the plate 134 will thus be automatically elevated but it cannot be removed due to clearance considerations. If glass 134 is to be removed for cleaning or the like, it is first necessary to remove the carrier from the subcarrier and this is done as noted before by first releasing the index cover glass 116 and raising it to move latch 126 out from under lip 128 to permit the carrier to be removed from the subcarrier, this will allow the glass 134 to be moved upwardly to such an extent that the hook 138 is moved out of cavity 140 and the glass can now be removed.

It will be noted that in all cases the bearing races present both generally vertical and generally horizontal surfaces with the result that the bearings can also withstand horizontal as well as vertical loads. The arrangement of the rear bearing of the carrier is such that the intermediate race member can be withdrawn from between the upper and lower ball bearings with ease. Similarly, the rear bearing can be reassembled with ease. The front bearing for the carrier permits easy vertical separation. In use this could be disconcerting. Therefore, the index grid glass plate is utilized to latch the carrier to the subcarrier and prevent such separation.

It will be noted the front bearing of the carrier includes a retainer which projects into the undercut 92. Both edges of the retainer project into cooperating slots. This prevents loss of the retainer except for the fact that it would tend to come out the ends of the slot. For this reason a screw 146 is threaded into each end of the slot. The retainer 108 in the rear bearing assembly is also retained by screws 148 threaded into the slot as may be seen in FIG. 2. Similarly, the bearing retainer in each of the side rails is retained in the rail by means of a screw 150 threaded into the rear end of the rail, the front end being closed by its abutting relationship with the base or drawer.

I claim:

1. A microfiche assembly comprising,
    a base provided with spaced parallel rails extending fore and aft on the base,
    a subcarrier slidably mounted on the rails,
    a fiche carrier,
    spaced parallel front and rear bearing means between the carrier and subcarrier enabling the carrier to move sideways relative to the subcarrier,
    means preventing vertical separation of said rear bearing means,
    said front bearing means allowing vertical separation,
    means for latching the carrier to the subcarrier by preventing vertical separation of the front bearing means to retain the front bearing means effective and prevent removal of the carrier from the subcarrier,
    said latching means being operable to release the carrier to permit vertical separation of the front bearing means,
    said rear bearing means permitting horizontal separation when the front of the carrier is raised.

2. A microfiche assembly according to claim 1 in which said front and rear bearing means absorb vertical and horizontal loads.

3. A microfiche assembly according to claim 2 in which both the front and rear bearing means include ball bearings.

4. A microfiche assembly according to claim 3 in which each bearing means is provided with means retaining said ball bearings in association with the subcarrier when the bearing means are separated, each bearing means including a race on the carrier and a race on the subcarrier and each race includes horizontally and vertically extending surfaces capturing the balls therebetween.

5. A microfiche assembly according to claim 4 in which the means preventing vertical separation of the rear bearing means comprises, the rear race on the subcarrier including vertically spaced upper and lower races, the upper rear race being generally shaped as a mirror image of the lower rear race of the subcarrier, the carrier rear race including upwardly and downwardly vertically facing races generally complimentary to the subcarrier races and capturing upper and lower ball bearings between the upper and lower race pairs.

6. A microfiche assembly according to claim 1 in which said base comprises a drawer having electrical connection means thereon,
 a reader housing having an opening to receive said base therein and including electrical connection means connecting to the drawer connection means when the drawer is mounted in said opening.

7. A microfiche assembly according to claim 1 in which the subcarrier is mounted on the rails by bearing means like said rear bearing means with the rails being provided with upper and lower races like the subcarrier rear races and the subcarrier is provided with side bearing races like the rear of the carrier whereby the bearing arrangement of the rails absorbs upward or downward loading.

8. A microfiche assembly according to claim 1 in which the base includes a light source and means for projecting light upwardly through a fiche in said carrier,
 said carrier extending forwardly of the front bearing means and including a light transmitting support for an index grid,
 means in the base for projecting an index beam of light upwardly to the index grid,
 a light transmitting cover for the index grid, said cover being pivotally mounted on its rear edge to permit the cover to be raised, said latch means being carried by said cover and engaging the subcarrier.

9. This is a microfiche assembly according to claim 1 in which the carrier extends forwardly of the front bearing means and includes a light transmitting support for an index grid, a light transmitting cover for the index grid, said cover being pivotally mounted on its rear edge to permit the cover to be raised, said latch means being carried by said cover and engaging the subcarrier.

* * * * *